UNITED STATES PATENT OFFICE.

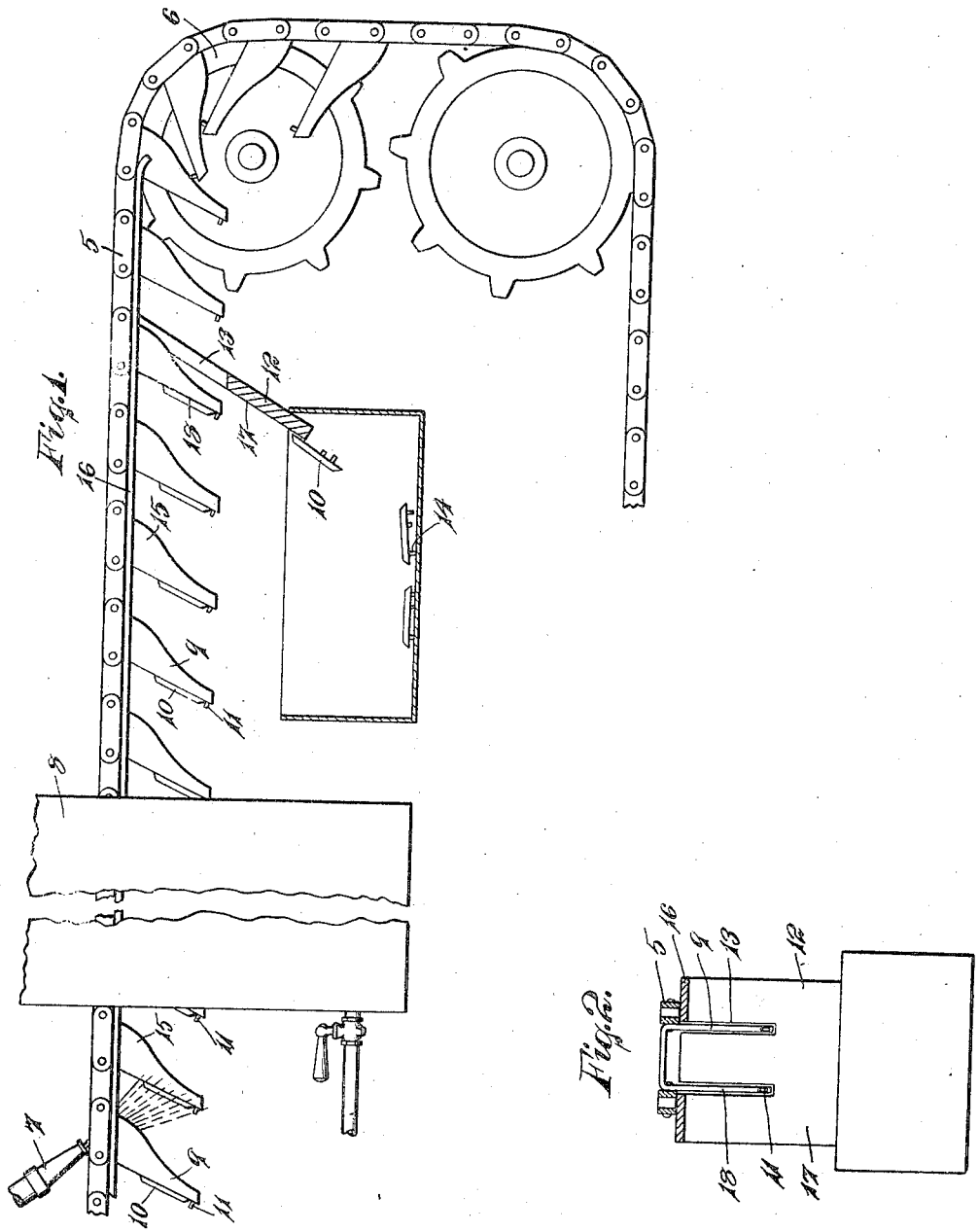

ELMER B. STONE, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

CONVEYING AND DISCHARGING APPARATUS.

1,342,975.    Specification of Letters Patent.    Patented June 8, 1920.

Application filed December 26, 1917. Serial No. 208,727.

*To all whom it may concern:*

Be it known that I, ELMER B. STONE, a citizen of the United States, residing at New Britain, in the county of Hartford and State of Connecticut, have invented a new and Improved Conveying and Discharging Apparatus, of which the following is a specification.

My invention relates to the class of devices employed more especially for conveying small articles for certain purposes, and to means for automatically removing the articles from the conveyer, and an object of my invention, among others, is to provide an apparatus of this class that shall enable the conveyer to travel at a maximum rate of speed and one in which the articles may be automatically, rapidly and efficiently removed therefrom.

One form of apparatus embodying my invention, and in the construction and use of which the objects herein set out, as well as others, may be attained, is illustrated in the accompanying drawings, in which—

Figure 1 is a view in side elevation of a portion of an apparatus embodying my invention.

Fig. 2 is a view in cross section through the conveyer showing the face of the discharge plate.

While my invention may be applied to conveyers employed for different purposes, it is especially applicable for the purpose of conveying small articles while being subjected to different operations, and as it is practically applicable for the purpose of conveying lock parts and similar articles for the purpose of having lacquer applied thereto, my invention is illustrated and described herein in connection with such an apparatus in which the numeral 5 denotes a conveyer chain which may be of any suitable and well known construction, so far as the links themselves are concerned, and which is supported upon sprocket wheels, a portion only of which wheels 6 are shown herein. Movement may be imparted to the chain in any desired manner, as by means of power applied to one of the sprocket wheels that supports the chain. A spraying device is supported in proximity to the chain, such sprayer preferably including a nozzle located on each side of the chain, only one of such nozzles 7 being shown herein, the nozzles being so arranged that the articles will be thoroughly sprayed in their movement, caused by the conveyer chain, past said nozzles. A drying device, in the form of an oven 8, is so located that the conveyer chain passes through said oven and it will be of such size that the articles will be properly dried as they pass therethrough.

In the special form of my apparatus illustrated and described herein arms 9 are secured to the chain 5 in any suitable manner, these arms being inclined from a vertical position and as shown in Fig. 1 of the drawings, so that the articles 10 will rest easily against the supports in a manner to prevent accidental displacement, but yet so near a vertical position as to require little power to remove them from supporting pins 11 projecting from the edges of the arms. These arms are preferably arranged in pairs located just a sufficient distance apart to avoid interference with an article being removed from the next preceding set of arms, that is, the distance being such that the article will have a chance to drop and clear itself without being struck by the following set of arms. In order to provide rigidity of the arms they are made of considerable width at that end that is secured to the chain, and in order to increase the clearance space between the arms they are tapered toward their tips as clearly shown in Fig. 1 of the drawings.

A discharge plate 12 is rigidly supported in any suitable manner at any desired point along the length of the chain, as shown herein this discharge plate being located a short distance away from the oven 8. It has two slots 13, preferably of a width but slightly greater than the thickness of the arms 9 so that there will be no chance for projecting parts from the articles being operated upon to be caught in the slots between the arms 9 and the edges of said slots. Metal articles, as lock plates, that are illustrated as being treated herein, have projecting parts as studs or pins 14, and it is to avoid the catching of such projections within the slots 13 that the latter are made just wide enough to permit passage of the arms 9. In order to avoid obstruction to the arms 9 in passing through the slots and to enable them to readily enter the same the wide parts 15 of the arms are made use of, these wide parts entering the slots at a point close to the conveyer chain and where the latter is supported as by a rail 16 so that there is little chance of sidewise play of the chain and, therefore, little liability of the arms 9 catching at this point. By tapering the arms toward the tip they are caused to pass into the slots without danger of catching on the edges thereof. The pins 11 are arranged at such angle that the articles may be readily removed therefrom, and the face 17 of the plate 12 is preferably arranged at such angle to the front edges 18 of the arms 9 that a force will be applied to lift the articles 10 as the arms pass into the slots in the plate and thus aid in removing them easily from the pins on the arms, this lessening the chances for the articles catching, or for such vibration of the parts as would snap and throw the articles against the following pairs of arms, thus interfering with the operating of the conveyer.

In accordance with the provisions of the patent statutes I have described the principles of operation of my invention, together with the apparatus which I now consider to represent the best embodiment thereof; but I desire to have it understood that the apparatus shown is only illustrative, and that the invention may be carried out by other means.

I claim—

1. A conveyer including a movable member, arms projecting from said member in closely spaced relation, the spaces between said arms tapering to wider dimensions at their outer ends for clearance of articles therefrom, means for supporting articles on the front edges of said arms, and means for removing articles from the arms.

2. A conveyer including a movable member, arms projecting from said member in pairs arranged in closely spaced relation, the spaces between the pairs of arms tapering to wider dimensions at their outer ends for the clearance of articles therefrom, means for supporting articles on the front edges of the arms, and means for removing articles from the arms.

3. A conveyer including a movable member, arms projecting from said member in closely spaced relation, said arms having straight front edges and tapered back edges, producing spaces between the arms widest at their outer ends for clearance of articles from the arms, means for supporting articles on the front edges of the arms when they are vertically disposed, and means for removing articles from the arms.

4. A conveyer including a movable member, an arm projecting from said member, means for imparting movement to said member, and a discharge plate having a slot corresponding in shape to the shape of the sides of the arms and of a width to closely fit the arm to permit free movement of the arms therethrough.

5. A conveyer including a movable member, arms projecting from said member in closely spaced relation, the spaces between said arms tapering to a wider dimension at their outer ends for clearance of articles therefrom, a discharge plate having a slot for the passage of said arms and arranged at an angle to the front edges of said arms to reduce pressure of the articles against the plate, and means for supporting articles on the front edges of said arms.

6. A conveyer including a conveyer chain, means for moving said chain, arms projecting in pairs from said chain, and having spaces between said pairs of arms, means for supporting articles on the front edges of said arms, and a discharge plate having slots corresponding in shape to the shape of the sides of the arms and of a width to closely fit but permit free passage of the pairs of arms, the face of said plate being arranged at an angle to said chain different from the angle of inclination of the front edges of said arms with respect to said chain to reduce pressure of the articles against the arms.

7. A conveyer including a conveyer chain, arms projecting from said chain in pairs arranged in closely spaced relation and having tapered spaces between them widest at their outer ends for clearance of articles therefrom, means for supporting articles on the front edges of said arms, and a discharge plate having slots for the passage of said arms, the face of said plate being arranged at an angle to the front edges of said arms to reduce pressure of articles against the arms.

8. A conveyer including a movable member arranged to travel in a horizontal direction, arms depending from said member in a plane passing therethrough and in closely spaced relation, the spaces between the arms being widest at their outer ends, means for supporting articles on said arms, and means for removing articles from said arms.

9. A conveyer including a chain comprising two runs located in substantially the same vertical plane, arms depending from one of said runs, means for supporting articles on said arms, and a discharge plate arranged at an angle to said conveyer different from the angle of inclination of the supporting edges of said arms with respect to said chain to engage the articles thereon at the discharge point and thereby aid in the discharge of articles therefrom.

10. A conveyer including a movable member, arms projecting from said member in closely spaced relation, the spaces between said arms tapering to a wider dimension at their outer ends for clearance of articles therefrom, a discharge plate having a slot for the passage of said arms and arranged at an angle to the front edges thereof to exert a lifting action on the articles on the conveyer as an aid in removal therefrom, and means for supporting articles on the front edge of said arms.

ELMER B. STONE.